(12) United States Patent
Sanayei et al.

(10) Patent No.: US 10,353,903 B2
(45) Date of Patent: Jul. 16, 2019

(54) COMPUTING SYSTEM WITH CORRELATION ESTIMATION MECHANISM AND METHOD OF OPERATION THEREOF

(71) Applicant: Samsung Electronics Co., Ltd., Suwon-si, Gyeonggi-Do (KR)

(72) Inventors: Shahab Sanayei, San Diego, CA (US); Jungwon Lee, San Diego, CA (US); Inyup Kang, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 874 days.

(21) Appl. No.: 14/161,654

(22) Filed: Jan. 22, 2014

(65) Prior Publication Data

US 2014/0207796 A1 Jul. 24, 2014

Related U.S. Application Data

(60) Provisional application No. 61/756,415, filed on Jan. 24, 2013.

(51) Int. Cl.
*G06F 16/2457* (2019.01)

(52) U.S. Cl.
CPC .............................. *G06F 16/24578* (2019.01)

(58) Field of Classification Search
CPC .................................................. G06F 17/3053
See application file for complete search history.

(56) References Cited

U.S. PATENT DOCUMENTS

| | | | |
|---|---|---|---|
| 2006/0039497 A1 | 2/2006 | Vu et al. | |
| 2007/0174038 A1 | 7/2007 | Wang et al. | |
| 2009/0300052 A1* | 12/2009 | Grichnik | G05B 17/02 |
| 2010/0202343 A1* | 8/2010 | Hunzinger | H04B 7/155 |
| | | | 370/315 |

FOREIGN PATENT DOCUMENTS

| | | |
|---|---|---|
| WO | 02101643 A2 | 12/2002 |
| WO | 2012075604 A1 | 6/2012 |

* cited by examiner

*Primary Examiner* — Manuel A Rivera Vargas

(57) ABSTRACT

A computing system includes: a sensor configured to receive an input observation including a sample count for processing an original content; and a control unit, coupled to the sensor, configured to: generate a covariance estimate based on the input observation for identifying the original content associated with the input observation for implementing a linear estimation mechanism, and calculate a weight combination based on the covariance estimate for identifying the original content.

20 Claims, 3 Drawing Sheets

COMPUTING SYSTEM WITH CORRELATION ESTIMATION MECHANISM AND METHOD OF OPERATION THEREOF

CROSS-REFERENCE TO RELATED APPLICATION

This application claims the benefit of U.S. Provisional Patent Application Ser. No. 61/756,415 filed Jan. 24, 2013, and the subject matter thereof is incorporated herein by reference thereto.

TECHNICAL FIELD

An embodiment of the present invention relates generally to a computing system, and more particularly to a system with correlation estimation mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires processing of more sophisticated data, increasing amounts of data for a given period of time or circumstance. Estimating parameters with inherent redundancy and correlation is ubiquitous in many systems such as wireless communications.

Thus, a need still remains for a computing system with correlation estimation mechanism. In view of the ever-increasing commercial competitive pressures to find efficient method where the redundancy in data can be exploited to improve the performance, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a sensor configured to receive an input observation including a sample count for processing an original content; and a control unit, coupled to the sensor, configured to: generate a covariance estimate based on the input observation for identifying the original content associated with the input observation for implementing a linear estimation mechanism, and calculate a weight combination based on the covariance estimate for identifying the original content.

An embodiment of the present invention provides a method of operation of a computing system including: receiving an input observation including a sample count for processing an original content; generating a covariance estimate with a control unit based on the input observation for identifying the original content associated with the input observation; and calculating a weight combination based on the covariance estimate for identifying the original content.

An embodiment of the present invention provides a non-transitory computer readable medium including instructions for operating a computing system including: logging an input observation including a sample count for processing an original content; generating a covariance estimate based on the input observation for identifying the original content associated with the input observation; and calculating a weight combination based on the covariance estimate for identifying the original content.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
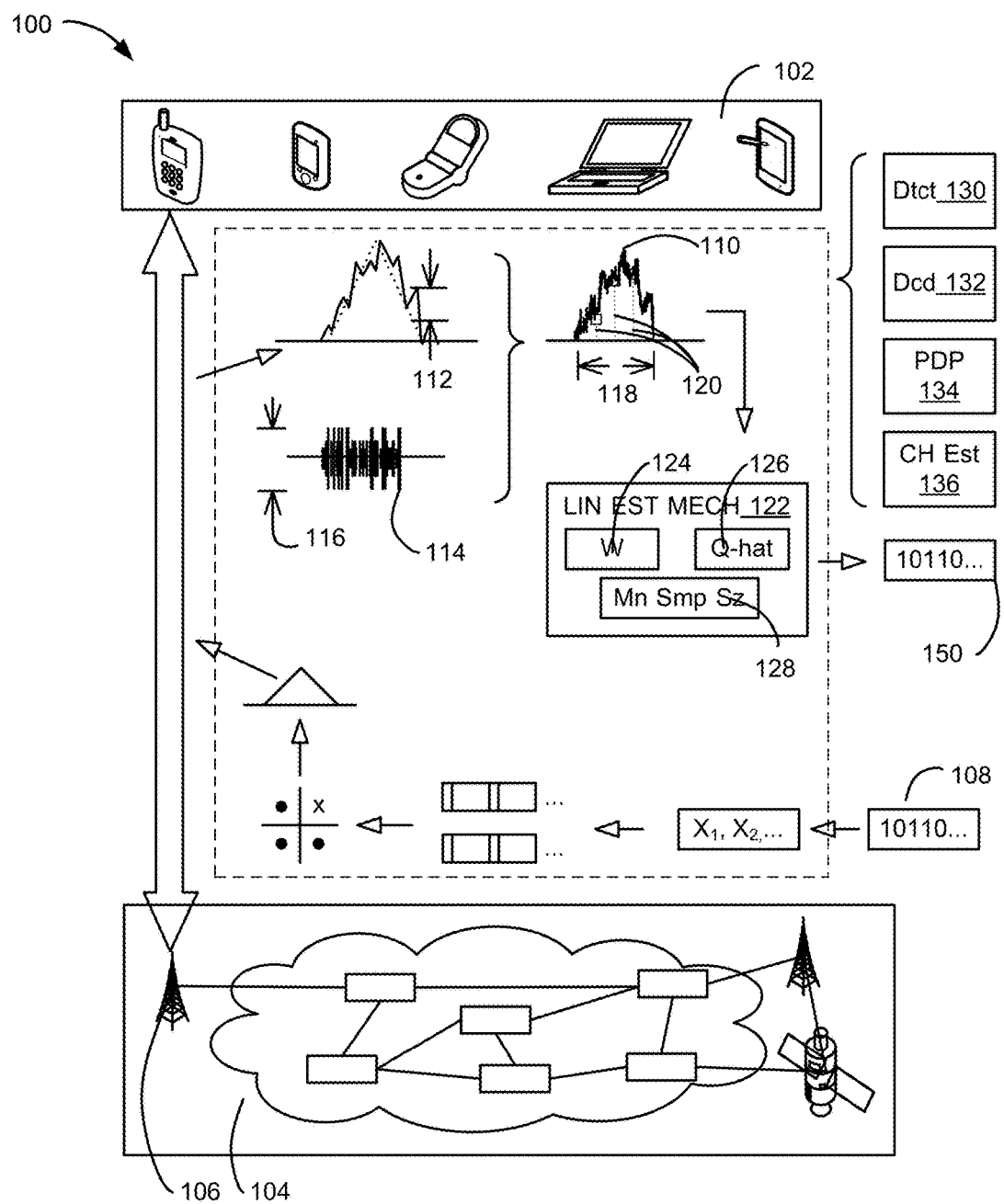
FIG. 1 is a computing system with correlation estimation mechanism in an embodiment of the present invention.

The following embodiments of the present invention can be used to process an original content. The original content can be processed from an input observation including a sample count associated with a minimal sample size. The input observation can be used to generate a covariance estimate for implementing a linear estimation mechanism for the minimal sample size. The covariance estimate can be further used to generate a weight combination, which can be applied to the input observation for producing an estimation result approximating the original content. The covariance estimate and the linear estimation mechanism provide improved convergence rate and lower error.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes filtering signals, decoding symbols, assembling data structures, transferring data structures, manipulating data structures, and reading and writing data structures. Signal processing can include operations on or analysis of analog or digital signals, representing time-varying or spatially varying physical quantities, such as for sound, electromagnetic radiation, images, sensor readings, or a combination thereof. Data structures are defined to be information arranged as symbols, packets, blocks, files, input data, system generated data, such as calculated or generated data, and program data.

Referring now to FIG. 1, therein is shown a computing system 100 with correlation estimation mechanism in an embodiment of the present invention. The computing system 100 includes a first device 102, such as a mobile device including a cellular phone or a notebook computer, connected to a network 104. The network 104 is a system of wired or wireless communication devices or means that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The computing system 100 can include a second device 106 for directly or indirectly linking and communicating with the first device 102. The network 104 can include the second device 106. The second device 106 can receive wireless signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can be a base station, can be included or with a cell tower, a wireless router, an antenna, a processing device, or a combination thereof being used to send signals to or receive signals from the first device 102, such as a smart phone or a laptop computer.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The computing system 100 can process an original content 108 from an input observation 110. The original content 108 is data intended for reproduction or access through a communication or a process. The original content 108 can be data or information, including real or complex values, a vector thereof, a set thereof, or a combination thereof. The original content 108 can be represented as '$x_k \in C^{M \times 1}$' with '$C^{M \times 1}$' representing a column vector of complex values having a size of 'M×1'.

For example, the original content 108 can include a vector of circularly symmetric Gaussian distributed data with zero mean value and a covariance value. The covariance value can be represented as 'Q'. The covariance value can be unknown a priori to the computing system 100, a device therein, a portion therein, or a combination thereof.

Also for example, the original content 108 can be a sequence of bits intended for displaying, audibly recreating, executing instructions, storing, or a combination thereof. Also for example, the original content 108 can be data sent from a transmitting device and intended for reproduction at a receiving device, such as the second device 106, the first device 102. Also for example, the original content 108 can be data recovered or sought by processing the input observation 110.

The input observation 110 is data or information available for determining or recovering the original content 108. The input observation 110 can be a derivation or a transformation of the original content 108. The input observation 110 can be data or information available or accessible for a device, a user, a service, or a combination thereof. The input observation 110 can be data or information available as an input to a process for determining or recovering the original content 108. The input observation 110 can be represented as '$y_k \in C^N$'.

The input observation 110 can be based on a data mixer 112, a noise component 114, or a combination thereof. The input observation 110 can be represented as:

$$y_k = Ax_k + n_k. \quad \text{Equation (1)}.$$

The data mixer 112 can be represented as 'A'. The noise component 114 can be represented as '$n_k$'.

The data mixer 112 is a set of information or value representing a scaling or a multiplicative relationship between the original content 108 and the input observation 110. The data mixer 112 can be full rank. The data mixer 112 can be represented as '$A \in C^{N \times M}$'.

The data mixer 112 can include a scaling factor, data or information, including real or complex values, a vector thereof, a set thereof, or a combination thereof. The data mixer 112 can be known by the computing system 100. The computing system 100 can include the data mixer 112 predetermined by the computing system 100, such as in a look-up table. The computing system 100 can further determine the data mixer 112 from the input observation 110.

For example, the data mixer 112 can include a channel estimation, an encryption or a decryption, a transformation mechanism, a scalar, a key therein, or a combination thereof. Also for example, the data mixer 112 can represent changes to or degradation in the original content 108 during communication or processing.

The noise component 114 is error or deviations in the data. The noise component 114 can be from a processing channel or a route for the data, hardware components processing signals, or a combination thereof. The noise component 114 can also include changes in the signal or the data due to hardware component limitations, such as tolerance levels or cross-talk between components. The noise component 114 can be represented as '$n_k$'.

For example, the noise component 114 can be additive in nature and have a random Gaussian or Rayleigh distribution for the changes. As a more specific example, the noise component 114 can include an additive circularly symmetric white Gaussian noise with zero mean.

The noise component 114 can include a noise variance 116. The noise variance 116 is a statistical characteristic of the noise component 114. The noise variance 116 can be a covariance of the noise component 114. The noise variance 116 can be a measure of spread, distancing, a density, or a combination thereof for the noise component 114.

The noise variance 116 can be known to the computing system 100. For example, the computing system 100 can estimate the noise variance 116, represented as '$\sigma^2$' or '$\sigma^2 I$' with 'I' further representing an identity matrix. Also for example, the computing system 100 can include the noise variance 116 predetermined by the computing system 100, such as in a look-up table, determined using a dedicated device or circuitry, or a combination thereof.

The input observation 110 can further include an observation size 118, a sample count 120, or a combination thereof. The observation size 118 is a representation of a magnitude or a quantity of the input observation 110. For example, the observation size 118 can include a number of characters, values, units or divisions of data portions, or a combination thereof.

The sample count 120 is a number of available samples available to the computing system 100 or a device therein. The sample count 120 can include sampling of the data. The sample count 120 can be equal to or greater than the observation size 118.

The computing system 100 can process for the original content 108 from the input observation 110 using a linear estimation mechanism 122. The linear estimation mechanism 122 can be for implementing linear minimum mean square estimation (LMMSE). The linear estimation mechanism 122 can include a process, an instruction, a hardware circuitry, such as gates or adders, or a combination thereof for estimating a result through minimizing a mean square error of a fitted value of a dependent variable. The linear estimation mechanism 122 can implement a Bayesian method for statistics or signal processing.

The computing system 100 can implement the linear estimation mechanism 122 using a weight combination 124, a covariance estimate 126, or a combination thereof. The computing system 100 can further implement the linear estimation mechanism 122 using a minimal sample size 128.

The weight combination 124 is a value or a set of values for determining the original content 108 from the input observation 110. The computing system 100 can apply or combine the weight combination 124 with the input observation 110 to recover the original content 108 or an estimate thereof.

The computing system 100 can generate the weight combination 124 based on the linear estimation mechanism 122. The computing system 100 can generate the weight combination 124 using the covariance value of the original content 108 or an estimate thereof.

The covariance estimate 126 is an estimate of the covariance value for the original content 108. The computing system 100 can utilize the covariance estimate 126 when the true instance of the covariance value is not known to the computing system. Details regarding the covariance estimate 126 will be described below.

The computing system 100 can implement the linear estimation mechanism 122 as:

$$\hat{x}_k = W^H(\hat{Q}) y_k. \qquad \text{Equation (2)}.$$

The weight combination 124 can be represented as 'W'. The term '$W^H$' can represent a Hermitian matrix of the weight combination 124, including a conjugate transpose of the weight combination. The covariance estimate 126 can be represented as '$\hat{Q}$'.

The minimal sample size 128 is a magnitude or a quantity of samples required for utilizing the linear estimation mechanism 122 using the covariance estimate 126. The minimal sample size 128 can be less than the magnitude or the number of samples required to determine the covariance value with the linear estimation mechanism 122. The minimal sample size 128 can be for using as a threshold, for controlling the observation size 118, for controlling the sample count 120, or a combination thereof.

The computing system 100 can generate the covariance estimate 126 from the input observation having the minimal sample size 128. The computing system 100 can generate the weight combination 124 based on the covariance estimate 126 for determining the original content 108. Details regarding the process of determining the original content 108 using the covariance estimate 126 will be described below.

The computing system 100 can use the linear estimation mechanism 122 with the weight combination 124, the covariance estimate 126, or a combination thereof for various processes. For example, the computing system 100 can utilize the linear estimation mechanism 122 for a detection mechanism 130, a decoding mechanism 132, a power-delay profile mechanism 134, a channel estimation mechanism 136, or a combination thereof.

The detection mechanism 130 can include a process, an instruction, a hardware circuitry, such as gates or adders, or a combination thereof for identifying signals, symbols, data, information, or a combination thereof in communicating between devices. For example, the detection mechanism 130 can include a detector.

The decoding mechanism 132 can include a process, an instruction, a hardware circuitry, such as gates or adders, or a combination thereof for reversing or undoing an encoding operation. The decoding mechanism 132 can include a decoder. The decoding mechanism 132 can be for communicating between devices. The decoding mechanism 132 can be for decoding according to a turbo coding mechanism, a polar coding mechanism, or a combination thereof.

The power-delay profile mechanism 134 can include a process, an instruction, a hardware circuitry, such as gates or adders, or a combination thereof for determining an intensity of a signal received through a direct channel or a multipath channel. The power-delay profile mechanism 134 can include a power delay profile (PDP). The power-delay profile mechanism 134 can determine the power or the intensity given a delay due to different paths for the same signal.

The channel estimation mechanism 136 can include a process, an instruction, a hardware circuit, such as gates or adders, or a combination thereof for determining an effect or a change for a signal traveling through a medium. The channel estimation mechanism 136 can describe and quantize reflection, loss, delay, refraction, obstructions, or a combination thereof a signal can experience while traversing between devices or processes. The channel estimation mechanism 136 can further characterize interference caused by other signals or transmitters.

For example, the computing system 100 can transmit the original content 108 from the second device 106 to the first device 102. The second device 106 can encode the original content 108 similar to the decoding mechanism 132, using a symbol according to a modulation scheme, or a combination thereof. The second device 106 can transmit the original content 108 through a transmission channel.

Continuing with the example, the transmission channel can be wireless, wired, or a combination thereof. The transmission channel can be a direct link between the first device 102 and the second device 106 or can include repeaters, amplifiers, or a combination thereof. For example, the transmission channel can include communication frequency, time slot, packet designation, transmission rate, channel code, or a combination thereof used for transmitting signals between the first device 102 and the second device 106.

Continuing with the example, the original content 108 can be received by the first device 102 as the input observation 110 after traversing the transmission channel. The computing system 100 or a device therein can use the detection mechanism 130 to identify and receive the input observation 110 altered from traversing the transmission channel.

Continuing with the example, the computing system 100 can process the input observation 110 based on the detection mechanism 130, the power-delay profile mechanism 134, or a combination thereof using the weight combination 124, the covariance estimate 126, or a combination thereof. As a more specific example, the detection mechanism 130, the power-delay profile mechanism 134, or a combination thereof can be based on a pilot tone or a reference portion used as predetermined according to a communication standard in communicating between devices.

Continuing with the example, the computing system 100 can use the channel estimation mechanism 136 to characterize the effects on the original content 108 from traversing the transmission channel, the noise component 114 from a device or the transmission channel, or a combination thereof. The computing system 100 can use the decoding mechanism 132 to recover or estimate the original content 108 from the input observation 110.

Continuing with the example, the computing system 100 can process the input observation 110 based on the decoding mechanism 132, the channel estimation mechanism 136, or a combination thereof using the weight combination 124, the covariance estimate 126, or a combination thereof. The computing system 100 can generate an estimation result 150 from processing the input observation 110 using the weight combination 124, the covariance estimate 126, or a combination thereof for estimating or recovering the original content 108.

For illustrative purposes, the computing system 100 is described as the second device 106 transmitting information and the first device 102 receiving the transmitted information. However, it is understood that the computing system 100 can have the second device 106 as the receiving device and the first device 102 as the transmitting device.

For further illustrative purposes, the computing system 100 is described as processing for the original content 108 after a communication process between devices, such as with a transmitter signal and a receiver signal. However, it is understood that the computing system 100 can generate and utilize the weight combination 124, the covariance estimate 126, or a combination thereof to process for the original content 108 for any process utilizing the linear estimation mechanism 122.

For example, the computing system 100 can utilize the weight combination 124, the covariance estimate 126, or a combination thereof for any signal processing scenario, including for digital television, sensor network, such as for a weather or for a data network, digital image, encryption or decryption, or a combination thereof. The computing system 100 can utilize a corresponding mechanism, such as a television signal-processing mechanism, a sensor mechanism, an image processing mechanism, an encryption mechanism, or a combination thereof.

For further illustrative purposes, the computing system 100 is shown as utilize the weight combination 124, the covariance estimate 126, or a combination thereof between the first device 102 and the second device 106. However, it is understood that the computing system 100 can utilize the weight combination 124, the covariance estimate 126, or a combination thereof in a variety of ways.

For example, the computing system 100 can process the signal utilizing the weight combination 124, the covariance estimate 126, or a combination thereof with the first device 102 only or the second device 106 only. Also for example, can process the signal utilizing the weight combination 124, the covariance estimate 126, or a combination thereof with one or more devices in addition to the first device 102 and the second device 106.

Figure 2:
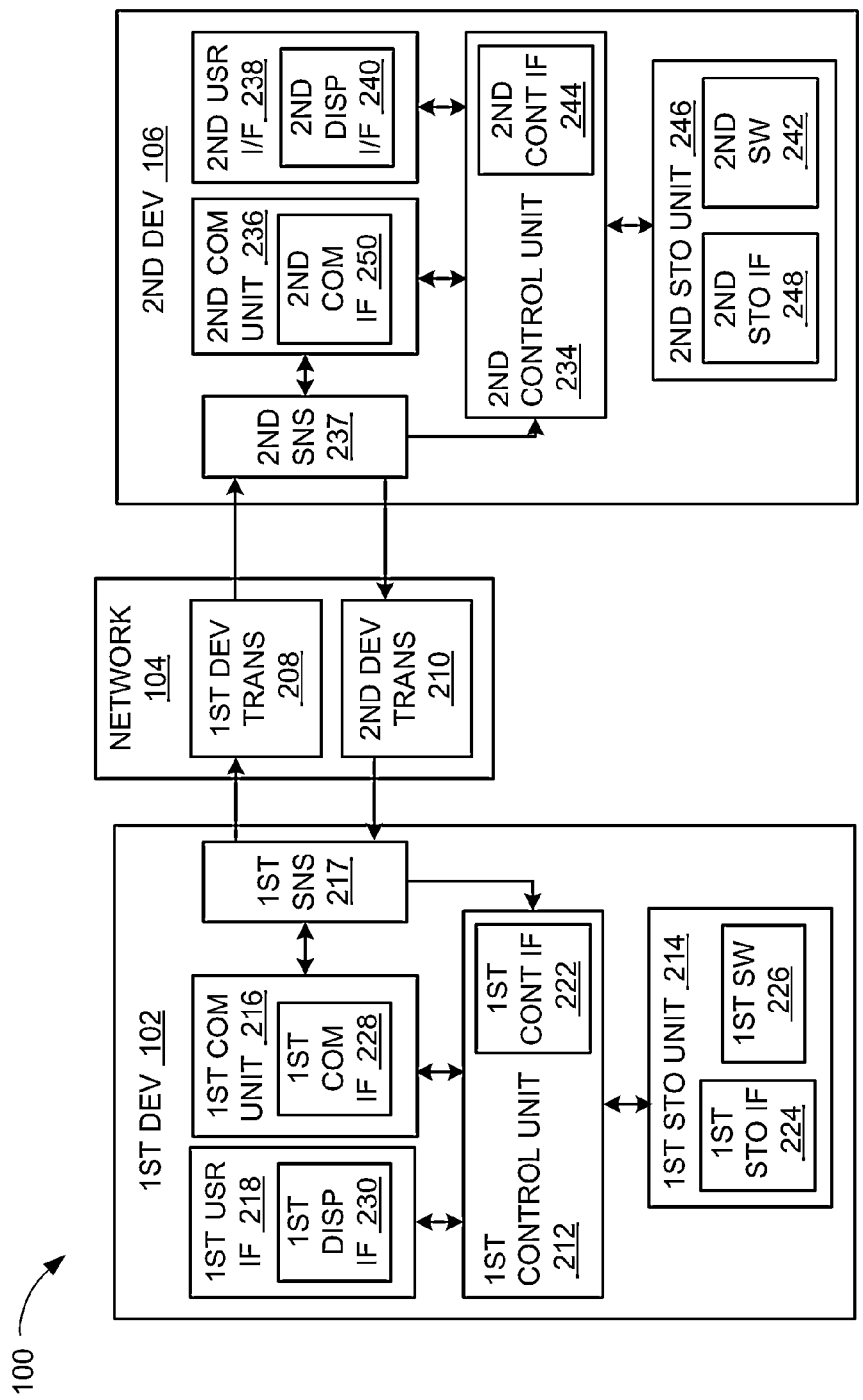
FIG. 2 is an exemplary block diagram of the computing system.

Referring now to FIG. 2, therein is shown an exemplary block diagram of the computing system 100. The computing system 100 can include the first device 102, the network 104, and the second device 106. The first device 102 can send information in a first device transmission 208 over the network 104 to the second device 106. The second device 106 can send information in a second device transmission 210 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218, and a location unit 220. The first control unit 212 can include a first control interface 222. The first control unit 212 can execute a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106, a different device, an attachment, such as a peripheral device or a desktop computer, the network 104, or a combination thereof.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first sensor 217. The first sensor 217 can be a device or a portion of a device for physically communicating signals. The first sensor 217 can communicate by detecting signals or conditions surrounding the first sensor 217, transmitting or receiving signals to or from another device, or a combination thereof. For example, the first sensor 217 can be for detecting weather conditions, detecting flow, such as for vehicle traffic or signal flow, receiving or reading images, receiving or transmitting wireless signals, or a combination thereof. Also for example, the first sensor 217 can include an omnidirectional antenna, a wire, an antenna chip, a ceramic antenna, a reader, a wire, other various sensors or detectors, or a combination thereof.

As a more specific example, the first sensor 217 can detect or respond to a power in electromagnetic waves and provide the detected result to the first communication unit 216 to receive a signal, including the second device transmission 210. The first sensor 217 can provide a path or respond to currents or voltages provided by the first communication unit 216 to transmit a signal, including the first device transmission 208. Also as a more specific example, the first sensor 217 can be coupled to the first control unit 212. The first sensor 217 can detect or respond to conditions or data and provide the results to the first control unit 212.

For illustrative purposes, the first sensor 217 is shown as a singular unit. However, it is understood that the first sensor 217 can include multiple independent devices, such as an antenna bank including multiple antennas, multiple receivers, multiple transmitters, multiple sensors, as for a sensor network or a data network, or a combination thereof.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100, including receiving location information from the location unit 220. The first control unit 212 can further execute the first software 226 for interaction with the network 104 via the first communication unit 216.

The location unit 220 can generate location information, current heading, current acceleration, and current speed of the first device 102, as examples. The location unit 220 can be implemented in many ways. For example, the location unit 220 can function as at least a part of the global positioning system, an inertial computing system, a cellular-tower location system, a pressure location system, or any combination thereof. Also, for example, the location unit 220 can utilize components such as an accelerometer or GPS receiver.

The location unit 220 can include a location interface 232. The location interface 232 can be used for communication between the location unit 220 and other functional units in the first device 102. The location interface 232 can also be used for communication external to the first device 102.

The location interface 232 can receive information from the other functional units or from external sources, or can transmit information to the other functional units or to external destinations. The external sources and the external destinations refer to sources and destinations external to the first device 102.

The location interface 232 can include different implementations depending on which functional units or external units are being interfaced with the location unit 220. The location interface 232 can be implemented with technologies and techniques similar to the implementation of the first control unit 212.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, a second user interface 238, and a second storage unit 246.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the network 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or resistors, for interaction with the network 104.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 236 can further include one or more portions for storing information, such as cache or RAM memory, registers, or a combination thereof.

The second communication unit 236 can be coupled with a second sensor 237. The second sensor 237 can be a device or a portion of a device for physically communicating signals. The second sensor 237 can communicate by detecting signals or conditions surrounding the second sensor 237, transmitting or receiving signals to or from another device, or a combination thereof. For example, the second sensor 237 can be for detecting weather conditions, detecting flow, such as for vehicle traffic or signal flow, receiving or reading images, receiving or transmitting wireless signals, or a combination thereof. Also for example, the second sensor 237 can include an omnidirectional antenna, a wire, an antenna chip, a ceramic antenna, a reader, a wire, other various sensors or detectors, or a combination thereof.

As a more specific example, the second sensor 237 can detect or respond to a power in electromagnetic waves and provide the detected result to the second communication unit 236 to receive a signal, including the first device transmission 208. The second sensor 237 can provide a path or respond to currents or voltages provided by the second communication unit 236 to transmit a signal, including the second device transmission 210. Also as a more specific example, the second sensor 237 can be coupled to the second control unit 234. The second sensor 237 can detect or respond to conditions or data and provide the results to the second control unit 234.

For illustrative purposes, the second sensor 237 is shown as a singular unit. However, it is understood that the second sensor 237 can include multiple independent devices, such as an antenna bank including multiple antennas, multiple receivers, multiple transmitters, multiple sensors, as for a sensor network or a data network, or a combination thereof.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The computing system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 3:
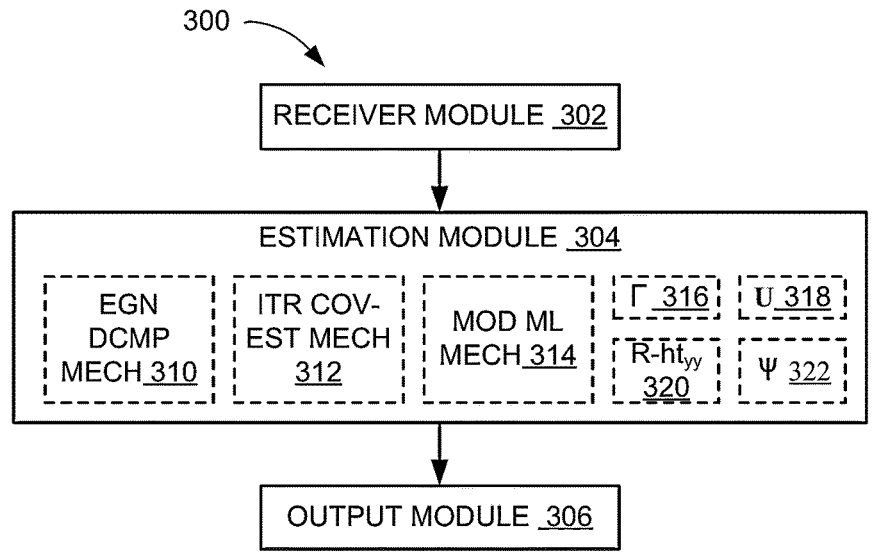
FIG. 3 is a control flow of the computing system.

Referring now to FIG. 3, therein is shown a control flow 300 of the computing system 100. The computing system 100 of FIG. 1 can include a receiver module 302, an estimation module 304, an output module 306, or a combination thereof.

The receiver module 302 can be coupled to the estimation module 304, which can be further coupled to the output module 306. The modules can be coupled to each other in a variety of ways. For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more outputs of the receiver module 302 can be connected to one or more inputs of the estimation module 304 using conductors or the transmission channel without intervening modules or devices there-between. Also for example, the estimation module 304 can be coupled to the output module 306 directly, similar to the receiver module 302 and the estimation module 304, or indirectly using a wireless channel with a repeater, a switch, a routing device, or a combination thereof connecting the estimation module 304 and the output module 306.

The computing system 100 can communicate with or using a device, such as by displaying images, recreating sounds, exchanging process steps or instructions, or a combination thereof. The computing system 100 can initiate the communication by sending information from a transmitting device to a receiving device. The receiving device can communicate with the user by displaying images, recreating sounds, exchanging process steps or instructions, or a combination thereof according to the information communicate to the device.

The receiver module 302 is configured to receive the input observation 110 of FIG. 1. The receiver module 302 can receive the input observation 110 corresponding to the original content 108 of FIG. 1. The receiver module 302 can receive the input observation 110 by recording electrical power, voltage, current, or a combination thereof.

For example, the receiver module 302 can receive the input observation 110 by recording energy levels or changes therein for the first sensor 217 of FIG. 2, the second sensor 237 of FIG. 2, the first communication interface 228 of FIG. 2, the second communication interface 250 of FIG. 2, the first control interface 222 of FIG. 2, the second control interface 244 of FIG. 2, or a combination thereof. As a more specific example, the receiver module 302 can receive the input observation 110 by recording energy levels or changes received through a wireless antenna, a wire or a conductor, an instruction or a step for transferring data between devices, processes, instructions, between portions therein, or a combination thereof. Also for example, the receiver module 302 can record the input observation 110 by storing the energy levels or changes therein, according to a time, a sequence, or a combination thereof in the first communication unit 216 of FIG. 2, the second communication unit 236 of FIG. 2, the first storage unit 214 of FIG. 2, the second storage unit 246 of FIG. 2, or a combination thereof.

The receiver module 302 can receive the input observation 110 having the sample count 120 of FIG. 1, the observation size 118 of FIG. 1 or a combination thereof. The receiver module 302 can receive the input observation 110 based on a method or a process predetermined by the computing system 100 or a standard for controlling a sampling rate, a block size, a symbol size, or a combination thereof. The predetermined method or process can determine the sample count 120, the observation size 118, or a combination thereof.

The receiver module 302 can further receive the input observation 110 based on the minimal sample size 128 of FIG. 1. For example, the receiver module 302 can receive the input observation 110 by controlling the sampling rate based on the minimal sample size 128. Also for example, the receiver module 302 can receive the input observation 110 by controlling a sampling session or duration based on the minimal sample size 128. Also for example, the receiver module 302 can divide or separate the initially captured instance of the input observation 110 into units of information based on the minimal sample size 128.

The receiver module 302 can further receive the input observation 110 by identifying known components therein. For example, the receiver module 302 can identify or determine the data mixer 112 of FIG. 1, the noise component 114 of FIG. 1, the noise variance 116 of FIG. 1, or a combination thereof.

As a more specific example, the receiver module 302 can determine the data mixer 112, the noise component 114, the noise variance 116, or a combination thereof using the reference portion, the pilot tone, or a combination thereof in the input observation 110. The receiver module 302 can determine the data mixer 112, the noise component 114, the noise variance 116, or a combination thereof according to a communication standard or a process predetermined by the computing system 100. The receiver module 302 can further determine the noise variance 116 using a statistical analysis of the input observation 110, by observing energy levels without the input observation 110, or a combination thereof.

Also as a more specific example, the receiver module 302 can determine the data mixer 112, the noise component 114, the noise variance 116, or a combination thereof using a dedicated device, circuitry, process, or a combination thereof. Also as a more specific example, the receiver module 302 can determine the data mixer 112, the noise component 114, the noise variance 116, or a combination thereof by identifying a stored set of values for the data mixer 112, the noise component 114, the noise variance 116, or a combination thereof, such as for a lookup table or a data model. The receiver module 302 can identify appropriate instance of the values as the data mixer 112, the noise component 114, the noise variance 116, or a combination thereof using the input observation 110 or a portion therein.

The receiver module 302 can determine the data mixer 112, the noise component 114, the noise variance 116, or a combination thereof using the first communication unit 216, the second communication unit 236, the first control unit 212 of FIG. 2, the second control unit 234 of FIG. 2, or a combination thereof. The receiver module 302 can store the data mixer 112, the noise component 114, the noise variance 116, or a combination thereof in the first communication unit 216, the second communication unit 236, the first storage unit 214, the second storage unit 246, or a combination thereof.

After receiving the input observation 110 and determining the components therein, the control flow 300 can pass to the estimation module 304. The control flow 300 can pass through a variety of ways. For example, control flow 300 can pass by having processing results of one module passed to another module, such as by passing the input observation 110, the determined components therein, or a combination thereof from the receiver module 302 to the estimation module 304, by storing the processing results at a location known and accessible to the other module, such as by storing the input observation 110, the determined components therein, or a combination thereof at a storage location known and accessible to the estimation module 304, by notifying the other module, such as by such as by using a flag, an interrupt, a status signal, or a combination for the estimation module 304, or a combination of processes thereof.

The estimation module 304 is configured to generate the covariance estimate 126 of FIG. 1, calculate the weight combination 124 of FIG. 1, or a combination thereof. The estimation module 304 can generate the covariance estimate 126 and calculate the weight combination 124 based on the covariance estimate 126.

The estimation module 304 can generate the covariance estimate 126, calculate the weight combination 124, or a combination thereof for identifying the original content 108 based on the input observation 110. The estimation module 304 can generate the covariance estimate 126, calculate the weight combination 124, or a combination thereof for implementing the linear estimation mechanism 122 of FIG. 1.

The estimation module 304 can generate the covariance estimate 126 using a variety of methods. For example, the estimation module 304 can generate the covariance estimate 126 based on an Eigen decomposition mechanism 310, an iterative covariance-estimation mechanism 312, a modified maximum-likelihood mechanism 314, or a combination thereof.

The Eigen decomposition mechanism 310 can include a process, an instruction, a hardware circuitry, such as gates or adders, or a combination thereof for factorization or separation of a set of values into different sets of values having a canonical or a normal characteristic. The Eigen decomposition mechanism 310 can factor a set of values, such as for a vector or a matrix of values, into three different sets of values. The resulting sets of values can include an Eigen value 316, an Eigen vector 318, or a combination thereof.

The Eigen vector 318 can include a set of non-zero values, such as for a matrix, producing a constant multiple of a multiplier. The Eigen value 316 can be a multiplier, when combined with the Eigen vector 318, produces the constant multiplier thereof.

For example, for an example square matrix represented as 'B', the Eigen vector 318 can include a non-zero vector that, when the example square matrix is multiplied by the Eigen vector 318, yields a constant multiple of the Eigen vector 318, with the constant multiple representing the Eigen value. The relationship between the Eigen vector 318, the Eigen value 316, and the example square matrix can be described as:

$$Bv = \lambda v. \qquad \text{Equation (3)}.$$

The Eigen vector 318 can be represented as 'v' and the Eigen value 316 can be represented as '$\lambda$'.

The iterative covariance-estimation mechanism 312 is a process, an instruction, a hardware circuitry, such as gates or adders, or a combination thereof for utilizing a repeated set of a sub-process, subset of instructions, a smaller or an inner hardware circuitry, or a combination thereof for generating the covariance estimate 126. Details regarding the iterative covariance-estimation mechanism 312 will be described below.

The modified maximum-likelihood mechanism 314 is a process, an instruction, a hardware circuitry, such as gates or adders, or a combination thereof for adjusted instance of a maximum-likelihood (ML) mechanism for generating the covariance estimate 126. The modified maximum-likelihood mechanism 314 and the ML mechanism can both be for calculating an input correlation 320.

The input correlation 320 is a statistical description of a similarity in behavior for multiple instances of random information. The input correlation 320 can include a measure of an amount of change for two random variables measured in the same mean time period. The input correlation 320 can be represented as '$\hat{R}_{yy}$'.

The estimation module 304 can generate the covariance estimate 126 based on the input correlation 320, the Eigen decomposition mechanism 310, or a combination thereof. For example, the estimation module 304 can generate the covariance estimate 126 using a sample-size correction 322. The sample-size correction 322 is an adjustment to the ML mechanism for compensating for a finite number of samples for the input observation 110. The sample-size correction 322 can correspond for each associated instance of the Eigen value 316. The sample-size correction 322 can be represented as '$\Psi$'.

Continuing with the example, the sample-size correction 322 can include a diagonal matrix, whose diagonal elements are given by:

$$[\Psi]_{ii} = \gamma_i - \frac{\sigma^2}{N_s}\bar{\eta}_i. \qquad \text{Equation (4)}$$

The sample-size correction 322 can be based on an application of the Eigen decomposition mechanism 310 for the input correlation 320. The Eigen decomposition of the input correlation 320 can be represented as:

$$\hat{R}_{yy} = U\Gamma U^H. \qquad \text{Equation (5)}.$$

The input correlation 320 can be represented as '$\hat{R}_{yy}$'. The Eigen value 316 of the input correlation 320 can be represented as '$\Gamma$', and the Eigen vector 318 of the input correlation 320 can be represented as 'U'.

Continuing with the example, the sample-size correction 322 can include a dominant Eigen value of the input correlation 320. The dominant Eigen value can be represented as:

$$\gamma_i = [\Gamma]_{ii}. \qquad \text{Equation (6)}.$$

The term '$\gamma_i$' can represent the $i^{th}$ dominant Eigen value of the input correlation 320 based on the Eigen value 316 of the input correlation 320.

Continuing with the example, the estimation module 304 can generate the covariance estimate 126 based on the data mixer 112, the Eigen vector 318 of the input correlation 320, the sample-size correction 322, or a combination thereof with the modified maximum-likelihood mechanism 314. The estimation module 304 can generate the covariance estimate 126 based on:

$$\hat{Q}_{ML,mod} = A^{\#}U\Psi U^H A^{\#H}. \qquad \text{Equation (7)}.$$

Continuing with the example, the covariance estimate 126 based on the modified maximum-likelihood mechanism 314 can be represented '$\hat{Q}_{ML,mod}$' the data mixer 112 can be represented as 'A', the Eigen vector 318 of the input correlation 320 can be represented as 'U', and the sample-size correction 322 can be represented as 'Ψ'. The term '$U^H$' can represent the Hermitian matrix of Eigen vector 318 of the input correlation 320. The term '$A^\#$' can represent a pseudo-inverse of the data mixer 112. The pseudo-inverse for any value, exemplified as 'B', can be based on:

$$B^\# = B(B^H B)^{-1} B^H.$$   Equation (8).

Also for example, the estimation module 304 can generate the covariance estimate 126 based on the modified maximum-likelihood mechanism 314 using the sample-size correction 322 based on a Wishart matrix. The estimation module 304 can generate the covariance estimate 126 based on:

$$\hat{R}_{yy} = AQA^H + \frac{1}{N_s}\varepsilon.$$   Equation (9)

The sample-size correction 322 based on the Wishart matrix can be represented as '$\frac{1}{N_s}\varepsilon$' with the sample count 120 represented as '$N_s$'. The estimation module 304 can use the sample-size correction 322 based on the Wishart matrix corresponding the modified maximum-likelihood mechanism 314 instead of the noise variance 116, represented as '$\sigma^2 I$', corresponding to the ML mechanism.

Continuing with the example, the term '$\varepsilon$' can represent a diagonal matrix whose diagonal elements are the mean value of the order Eigen values of the corresponding Wishart matrix, with:

$$\varepsilon = \begin{bmatrix} \bar{\eta}_1 & 0 & \cdots \\ 0 & \ddots & \ddots \\ \vdots & \ddots & \bar{\eta}_N \end{bmatrix}.$$   Equation (10)

The Wishart matrix can be represented as '$EE^H$', with 'E' representing a matrix for the noise component 114. The mean value of the order Eigen values can be based on:

$$f(\eta_1, \ldots, \eta_N) = \prod_{i=1}^{N} \frac{\eta_i^{N_s - N}}{(N_s - i)!(N - i)!} \prod_{i<j} (\eta_i - \eta_j)^2 e^{-\sum_{i=1}^{N}\eta_i}.$$   Equation (11)

Also for example, the estimation module 304 can generate the covariance estimate 126 based on the modified maximum-likelihood mechanism 314 by calculating the input correlation 320 based on the input observation 110, such as using a statistical calculation process. The estimation module 304 can calculate the Eigen vector 318 and the Eigen value 316 of the input correlation 320 based on the Eigen decomposition mechanism 310. The estimation module 304 can calculate the sample-size correction 322 based on the input observation 110 using the Eigen vector 318 and the Eigen value 316 of the input correlation 320 as described above, such as in Equation (4).

Continuing with the example, the estimation module 304 can generate the covariance estimate 126 by applying the sample-size correction 322 to each instance of the Eigen value 316. The estimation module 304 can reform and continue the processing for a remaining portion of the ML mechanism.

It has been discovered that the covariance estimate 126 based on the sample-size correction 322, input correlation 320, or a combination thereof corresponding to the modified maximum-likelihood mechanism 314 provides improved gain and convergence rate for utilizing the linear estimation mechanism 122. The sample-size correction 322 can account for the minimal sample size 128, and eliminate the depreciation in gain resulting from the ML mechanism utilizing the noise variance 116, by replacing the noise variance 116.

The estimation module 304 can use the first communication unit 216, the second communication unit 236, the first control unit 212, the second control unit 234, or a combination thereof to calculate the sample-size correction 322, generate the covariance estimate 126, implement the modified maximum-likelihood mechanism 314, implement the iterative covariance-estimation mechanism 312, or a combination thereof. The estimation module 304 can store the covariance estimate 126, any intermediate processing results thereof, or a combination thereof in the first communication unit 216, the second communication unit 236, the first storage unit 214, the second storage unit 246, or a combination thereof.

After generating the covariance estimate 126, the control flow can be passed to the output module 306. The control flow can pass similarly as described above between the receiver module 302 and the estimation module 304, but using the processing results of the estimation module 304, such as the covariance estimate 126.

The output module 306 is configured to determine the original content 108 based on the input observation 110 and the weight combination 124. The output module 306 can use the first communication unit 216, the second communication unit 236, the first control unit 212, the second control unit 234, or a combination thereof to calculate the weight combination 124 based on the covariance estimate 126.

The output module 306 can calculate the weight combination 124 based on:

$$W(Q_n) = (\sigma^2 I + AQ_n A^H)^{-1} AQ_n.$$   Equation (12).

The weight combination 124 can be represented as 'W', the covariance estimate 126 can be represented as '$Q_n$', the noise variance 116 of the input observation 110 can be represented by '$\sigma^2 I$', and the data mixer 112 corresponding to the input observation 110 can be represented by 'A'.

The output module 306 can apply the weight combination 124 to the input observation 110 to generate the estimation result 150 of FIG. 1 associated with the original content 108. The estimation result 150 can be an approximation of the original content 108 based on the input observation 110. The output module 306 can apply the weight combination 124 in using a variety of methods.

For example, the output module 306 can apply the weight combination 124 by using the weight combination 124 as a filter or filter taps and applying the filter to the input observation 110. Also for example, the output module 306 can apply the weight combination 124 based on Equation (2). As a more specific example, the output module 306 can generate the estimation result 150 as a product between the weight combination 124 and the input observation 110.

The output module 306 can store the weight combination 124, the estimation result 150 reflecting the original content 108, or a combination thereof in the first communication unit 216, the second communication unit 236, the first storage unit 214, the second storage unit 246, or a combination thereof. The computing system 100 can further process the estimation result 150, such as by executing instructions specified by the estimation result 150, using the first communication unit 216, the second communication unit 236, the first control unit 212, the second control unit 234, or a combination thereof. The computing system 100 can further communicate the estimation result 150 to the user of the first device 102 of FIG. 1, the second device 106 of FIG. 1, or a combination thereof using the first user interface 218 of FIG. 2, the second user interface 238 of FIG. 2, or a combination thereof.

The control flow 300 or the method 300 of operation of the computing system 100 includes: receiving an input observation including a sample count for processing an original content; generating a covariance estimate with a control unit based on the input observation for identifying the original content associated with the input observation; and calculating a weight combination based on the covariance estimate for identifying the original content.

Figure 4:
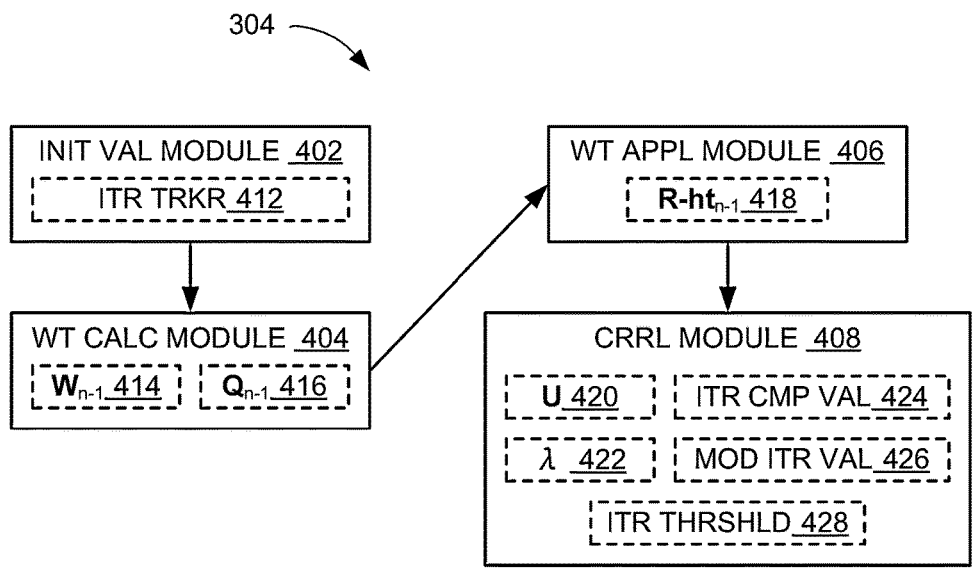
FIG. 4 is an exemplary block diagram of the estimation module.

Referring now to FIG. 4, therein is shown an exemplary block diagram of the estimation module 304. The exemplary block diagram can show the estimation module 304 implementing the iterative covariance-estimation mechanism 312 of FIG. 3.

The estimation module 304 can include an initial value module 402, a weight calculation module 404, a weight application module 406, a correlation module 408, or a combination thereof. The initial value module 402 can be coupled to the weight calculation module 404, which can be further coupled to the weight application module 406, the correlation module 408, or a combination thereof. The weight application module 406 can be further coupled to the correlation module 408. The modules can be coupled as described above.

The initial value module 402 is configured to set an initial instance of the covariance estimate 126 of FIG. 2. The initial value module 402 can further estimate the input correlation 320 of FIG. 3.

The initial value module 402 can set the initial instance of the covariance estimate 126 based on the input observation 110 of FIG. 2, any a-priori knowledge regarding the covariance value, such as a prior instance of the covariance estimate 126 or the estimation result 150 of FIG. 1 corresponding to a prior instance of the original content 108 of FIG. 1, or a combination thereof. The initial value module 402 can set the initial instance of the covariance estimate 126 as an identity matrix, represented as 'I', or based on:

$$\hat{Q} = A^\# X A^{\#H}.\qquad \text{Equation (13)}.$$

The covariance estimate 126 can be represented as '$\hat{Q}$', the data mixer 112 of FIG. 1 can be represented as 'A', and the original content 108 can be represented as 'X'.

The initial value module 402 can estimate the input correlation 320 based on:

$$\hat{R}_{yy} = \frac{1}{N_s} \sum_{k=1}^{N_s} y_k y_k^H. \qquad \text{Equation (14)}$$

The estimate of the input correlation 320 can be represented as '$\hat{R}_{yy}$', the sample count 120 of FIG. 1 can be represented as '$N_s$', and the input observation 110 can be represented as '$y_k$'.

After initializing the values as described above, the weight calculation module 404, the weight application module 406, and the correlation module 408 can iteratively adjust or calculate the covariance estimate 126. The initial value module 402 can set an initial value for an iteration tracker 412 for managing a length or a number of repetitions for the iterative process. The iteration tracker 412, represented as 'n', can be a non-negative integer value for representing a number of executions for a repeated set of instructions. The initial value module 402 can set the initial value for the iteration tracker 412 as 1.

The weight calculation module 404 is configured to calculate a prior weight 414. The weight calculation module 404 can calculate the prior weight 414 based on a prior covariance 416. The prior weight 414 is an intermediate instance of the weight combination 124 resulting from a prior instance of the iteration. The prior weight 414 can be represented as '$W_{n-1}$'.

For example, the prior weight 414 for the iteration tracker 412 including the value 1 can be represented as '$W_0$', and can correspond to the initial instance of the covariance estimate 126, represented as '$Q_0$'. Also for example, the prior weight 414 for the iteration tracker 412 including the value 2 can be represented as '$W_2$', and can correspond to the weight combination 124 from the iteration represented by the iteration tracker 412 including the value 1.

The prior covariance 416 is an intermediate instance of the covariance estimate 126 resulting from a prior instance of the iteration. The prior covariance 416 can be represented similar to the prior weight 414, as '$Q_{n-1}$'.

The weight calculation module 404 can calculate the prior weight 414 based on:

$$W_{n-1} = (\sigma^2 I + A Q_{n-1} A^H)^{-1} A Q_{n-1}. \qquad \text{Equation (15)}.$$

The noise variance 116 of FIG. 1 of the input observation 110 can be represented by '$\sigma^2 I$' and the data mixer 112 can be represented as 'A'.

The weight application module 406 is configured to calculate a prior correlation 418. The prior correlation 418 is an intermediate instance of the input correlation 320 resulting from a prior instance of the iteration. The prior correlation 418 can be represented similar to the prior weight 414, as '$\hat{R}_{n-1}$'.

The weight application module 406 can calculate the prior correlation 418 based on the prior weight 414, the estimate of the input correlation 320, or a combination thereof. The weight application module 406 can calculate the prior correlation 418 based on:

$$\hat{R}_{n-1} = W_{n-1}^H \hat{R}_{yy} W_{n-1}. \qquad \text{Equation (16)}.$$

The weight application module 406 can apply the weight combination 124, any derivation or portion thereof, or a combination thereof, including the prior weight 414, to the input correlation 320, any derivation or portion therein, or a combination thereof, such as the prior correlation 418 or the estimate of the input correlation 320.

The correlation module 408 is configured to generate the covariance estimate 126 corresponding to the iteration tracker 412. The covariance estimate 126 corresponding to the iteration tracker 412 can be represented as '$Q_n$'.

The correlation module 408 can generate the covariance estimate 126 corresponding to the iteration tracker 412 based on the prior correlation 418. The correlation module 408 can generate the covariance estimate 126 corresponding to the iteration tracker 412 based on:

$$Q_n A^H (\sigma^2 I + A Q_n A^H)^{-1} A Q_n = \hat{R}_{n-1}.$$ Equation (17).

The correlation module 408 can generate the covariance estimate 126 by solving for the covariance estimate 126 using Equation (17). The correlation module 408 can generate the covariance estimate 126 based on the data mixer 112, the noise variance 116, the prior correlation 418, or a combination thereof.

The estimation module 304 or the correlation module 408 therein can use Equation (13) to generate the covariance estimate 126. The processing described by Equation (13) can be based on using Equation (17).

The estimation module 304 or the correlation module 408 therein can calculate the estimate of the input correlation 320, the prior correlation 418, or a combination thereof. The estimation module 304 or the correlation module 408 therein can further calculate the input correlation 320, any derivation or portion therein, or a combination thereof, such as the prior correlation 418 or the estimate of the input correlation 320, based on:

$$\hat{R} = Q A^H (\sigma^2 I + A Q A^H)^{-1} A Q.$$ Equation (18).

The input correlation 320, any derivation or portion therein, or a combination thereof, such as the prior correlation 418 or the estimate of the input correlation 320, can be represented as '$\hat{R}$'. The term 'Q' can represent the covariance value, any derivation or estimation thereof, or a combination thereof, including the covariance estimate 126, the prior covariance 416, or a combination thereof.

The correlation module 408 can include a modification of Equation (18) based on the data mixer 112. The modification can be represented as:

$$A \hat{R} A^H = X (\sigma^2 I + X)^{-1} X.$$ Equation (19).

The correlation module 408 can assume:

$$X = A Q A^H.$$ Equation (20).

The correlation module 408 can generate the covariance estimate 126 using the Eigen decomposition mechanism 310 of FIG. 3. The correlation module 408 can use the Eigen decomposition mechanism 310 for the term '$A \hat{R} A^H$' and generate a decomposition vector 420 corresponding to the Eigen vector 318 of FIG. 3 of the term '$A \hat{R} A^H$' representing a combination of the data mixer 112 and the input correlation 320, any derivation or portion therein, or a combination thereof. The decomposition vector can be represented as 'U'.

The correlation module 408 can use the Eigen decomposition mechanism 310 for the term '$A \hat{R} A^H$' and generate a decomposition value 422. The decomposition value 422 can include the Eigen value 316 of FIG. 3 of the term '$A \hat{R} A^H$' representing a combination of the data mixer 112 and the input correlation 320, any derivation or portion therein, or a combination thereof. The decomposition value 422 can be represented as '$\Lambda$'. The decomposition value 422 can include diagonal elements represented as '$\lambda_i = \Lambda_{ii}$'.

The correlation module 408 can generate an iterative component-value 424 based on the decomposition value 422. The iterative component-value 424 is the Eigen value 316 corresponding to 'X' or a combination of the data mixer 112 and the covariance value, including a derivation or an estimate thereof, as described in Equation (20). The iterative component-value 424 can include diagonal elements represented as '$d_i$'. The iterative component-value 424 can be represented as:

$$d_i = \frac{\lambda_i + \sqrt{\lambda_i^2 + 4 \lambda_i \sigma^2}}{2}.$$ Equation (21)

The correlation module 408 can use the iterative component-value 424 to calculate the Eigen value 316, the Eigen vector 318, or a combination thereof corresponding to the term 'X'. The correlation module 408 can generate the covariance estimate 126 based on the iterative component-value 424 and Equation (13), such as by using the iterative component-value 424 or a derivation thereof for the term 'X'. For example, the correlation module 408 can generate the covariance estimate 126 based on the iterative component-value 424 or a derivation thereof and the data mixer 112.

The correlation module 408 can further incorporate the modified maximum-likelihood mechanism 314 of FIG. 3 to the second order process described above. The correlation module 408 can generate a modified-iterative value 426 based on the decomposition value 422, the modified maximum-likelihood mechanism 314, or a combination thereof. The modified-iterative value 426 can be similar to the iterative component-value 424. For example, the modified-iterative value 426 can be for representing the Eigen value 316, the Eigen vector 318, or a combination thereof corresponding to the term 'X', for generating the covariance estimate 126.

The correlation module 408 can generate the modified-iterative value 426 represented as:

$$d_i = \frac{\lambda_i + \sqrt{\lambda_i^2 + \frac{4 \lambda_i \bar{n}_i \sigma^2}{N_s}}}{2}.$$ Equation (22)

Equation (22) can be a modification to Equation (21) based on incorporating the modified maximum-likelihood mechanism 314. The noise variance 116 used in generating the iterative component-value 424 can be further adjusted based on the sample count 120, the mean value of the order Eigen values associated with the Wishart matrix, represented as '$\bar{n}_i$', or a combination thereof.

After generating the covariance estimate 126, the correlation module 408 can compare the iteration tracker 412 to an iteration threshold 428. The correlation module 408 can increment the iteration tracker 412 and pass the resulting instance of the covariance estimate 126 to the weight calculation module 404. The weight calculation module 404 can receive and use the resulting instance of the covariance estimate 126 as the prior weight 414 and continue a new instance of the iteration as described above.

The correlation module 408 can stop the iterative process. The correlation module 408 can generate the final resulting instance of the covariance estimate 126 or a resulting set thereof when the iteration tracker 412 is greater than the iteration threshold 428. The correlation module 408 can include the iteration threshold 428 predetermined by the computing system 100 or a standard. The correlation module 408 can further determine the iteration threshold 428 based on the observation size 118 of FIG. 1, the sample count 120, or a combination thereof according to a method or a process predetermined by the computing system 100 or a standard.

It has been discovered that the covariance estimate 126 and the linear estimation mechanism 122 of FIG. 1 provide improved convergence rate and lower error. The covariance estimate 126 and the linear estimation mechanism 122 can provide reliable results for smaller sample size, as opposed to a larger sample size required by the linear estimation mechanism 122 using the covariance value instead of the covariance estimate 126. The smaller sample size can improve the processing speed and simplify the processing steps leading to the improved convergence. The utilization of the linear estimation mechanism 122 for the smaller sample size can lead to the lower error.

It has further been discovered that the prior weight 414, the prior covariance 416, the prior correlation 418, and the iterative covariance-estimation mechanism 312 provide lower complexity and increased robustness in implementing the linear estimation mechanism 122. The iterative steps of the iterative covariance-estimation mechanism 312 individually involve simpler steps or instructions than processing a traditional instance of the linear estimation mechanism 122, which can further be expanded to account for different variations or scenarios.

It has further been discovered that the covariance estimate 126 based on the iterative component-value 424 provides reduction of required resources. The covariance estimate 126 based on the iterative component-value 424 can provide simpler and faster calculation for the input correlation 320 or a derivation thereof, which can lead to improved performance in generating the covariance estimate 126.

It has further been discovered that the covariance estimate 126 based on the modified-iterative value 426 provides improved gain and convergence rate while maintaining lower complexity and increased robustness. The covariance estimate 126 based on the modified-iterative value 426 can combine the iterative covariance-estimation mechanism 312 and the modified maximum-likelihood mechanism 314 and combine the benefits of both as described above.

The modules described in this application can be hardware implementation or hardware accelerators, including passive circuitry, active circuitry, or both, in the first communication unit 216 of FIG. 2, the second communication unit 236 of FIG. 2, the first control unit 216 of FIG. 2, the second control unit 238 of FIG. 2, or a combination thereof. The modules can also be hardware implementation or hardware accelerators, including passive circuitry, active circuitry, or both, within the first device 102 of FIG. 1 or the second device 106 of FIG. 2, but outside of the first communication unit 216, the second communication unit 236, the first control unit 216, the second control unit 238, or a combination thereof.

The computing system 100 of FIG. 1 has been described with module functions or order as an example. The computing system 100 can partition the modules differently or order the modules differently. For example, the functions of the output module 306 of FIG. 3 and the estimation module 304 can be combined. Also for example, the arrangement module 306 can include a sub-module for receiving the input observation 110. Also for example, the computing system 100 can include a separate the initial value module 402 into two modules, one for initializing the covariance estimate 126, one for estimating the input correlation 320, one for initializing the iteration tracker 412, or a combination thereof.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 216, the second communication unit 236, the first storage unit 214, the second storage unit 246, or a combination thereof can represent the non-transitory computer readable medium. The first communication unit 216, the second communication unit 236, first storage unit 214, the second storage unit 246, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation from the input observation 110 based on the covariance estimate 126 results in the movement in the physical world, such as content displayed or recreated for the user on the first device 102 from the estimation result 150 from the covariance estimate 126. The content reproduced on the first device 102, such as navigation information or voice signal of a caller, can influence the user's movement, such as following the navigation information or replying back to the caller. Movement in the physical world results in changes to the data mixer 112 or the noise component 114 of FIG. 1, which can be fed back into the computing system 100 and influence the input observation 110 and further the covariance estimate 126.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a sensor configured to receive an input observation from a wireless transmission including a sample count;
a communication unit, coupled to the sensor, configured to determine a noise component of the input observation, wherein the noise component includes cross-talk between components;
a control unit, coupled to the sensor and the communication unit, configured to:

generate a covariance estimate based on the noise component of the input observation for implementing a linear estimation mechanism, calculate a weight combination based on the covariance estimate, and determine a recovered original content from the input observation and the weight combination; and a user interface, coupled to the control unit, configured to display the recovered original content from the wireless transmission.

2. The computing system as claimed in claim 1, wherein the control unit is further configured to:

generate an input correlation based on the input observation; and generate the covariance estimate based on the input observation by generating the covariance estimate based on the input correlation using an iterative covariance-estimation mechanism.

3. The computing system as claimed in claim 1, wherein the control unit is further configured to:

calculate a sample-size correction based on the input observation; and generate the covariance estimate based on the input observation by generating the covariance estimate based on the sample-size correction with a modified maximum-likelihood mechanism.

4. The computing system as claimed in claim 1, wherein the control unit is further configured to:

generate a iterative component-value based on the input observation; and generate the covariance estimate based on the input observation by generating the covariance estimate based on the iterative component-value.

5. The computing system as claimed in claim 1, wherein the control unit is further configured to:

generate a modified-iterative value based on the input observation; and generate the covariance estimate based on the input observation by generating the covariance estimate based on the modified-iterative value.

6. The computing system as claimed in claim 1, wherein the control unit is further configured to generate the covariance estimate based on the input observation by generating the covariance estimate based on a minimal sample size for the input observation.

7. The computing system as claimed in claim 1, wherein the control unit is further configured to:

calculate a prior weight associated with the weight combination and corresponding to a prior instance of an iteration tracker for an iterative covariance-estimation mechanism;

calculate a prior correlation corresponding to an input correlation and corresponding to the prior instance of the iteration tracker; and generate the weight combination corresponding to the iteration tracker based on the prior correlation and the prior weight.

8. The computing system as claimed in claim 1, wherein the control unit is further configured to generate the weight combination based on an iterative covariance-estimation mechanism, a modified maximum-likelihood mechanism, or a combination thereof.

9. The computing system as claimed in claim 1, wherein the control unit is further configured to generate the covariance estimate based on the input observation by generating the covariance estimate for a power-delay profile mechanism, a channel estimation mechanism, or a combination thereof.

10. The computing system as claimed in claim 1, wherein the control unit is further configured to generate an estimation result using the weight combination according to a linear estimation mechanism for identifying the original content.

11. A method of operation of an computing system comprising:

receiving an input observation from a wireless transmission including a sample count;

determining a noise component of the input observation, wherein the noise component includes cross-talk between components;

generating a covariance estimate with a control unit based on the noise component of the input observation;

calculating a weight combination based on the covariance estimate;

determining a recovered original content from the input observation and the weight combination; and displaying the recovered original content from the wireless transmission.

12. The method as claimed in claim 11, wherein generating the covariance estimate includes:

generating an input correlation based on the input observation; and generating the covariance estimate based on the input correlation using an iterative covariance-estimation mechanism.

13. The method as claimed in claim 11, wherein generating the covariance estimate includes:

calculating a sample-size correction based on the input observation; and generating the covariance estimate based on the sample-size correction with a modified maximum-likelihood mechanism.

14. The method as claimed in claim 11, wherein generating the covariance estimate includes:

generating a iterative component-value based on the input observation; and generating the covariance estimate based on the iterative component-value.

15. The method as claimed in claim 11, wherein generating the covariance estimate includes:

generating a modified-iterative value based on the input observation; and generating the covariance estimate based on the modified-iterative value.

16. A non-transitory computer readable medium including a plurality of instructions that, when executed by a processor, are configured to cause the processor to:

log an input observation from a wireless transmission including a sample count;

determine a noise component of the input observation, wherein the noise component includes cross-talk between components;

generate a covariance estimate based on the noise component of the input observation;

calculate a weight combination based on the covariance estimate;

determine a recovered original content from the input observation and the weight combination; and display the recovered original content from the wireless transmission.

17. The non-transitory computer readable medium as claimed in claim 16, wherein the plurality of instructions is configured to cause the processor to generate the covariance estimate by:
- generating an input correlation based on the input observation; and
- generating the covariance estimate based on the input correlation using an iterative covariance-estimation mechanism.

18. The non-transitory computer readable medium as claimed in claim 16, wherein the plurality of instructions is configured to cause the processor to generate the covariance estimate by:
- calculating a sample-size correction based on the input observation; and
- generating the covariance estimate based on the sample-size correction with a modified maximum-likelihood mechanism.

19. The non-transitory computer readable medium as claimed in claim 16, wherein the plurality of instructions is configured to cause the processor to generate the covariance estimate by:
- generating a iterative component-value based on the input observation; and
- generating the covariance estimate based on the iterative component-value.

20. The non-transitory computer readable medium as claimed in claim 16, wherein the plurality of instructions is configured to cause the processor to generate the covariance estimate by:
- generating a modified-iterative value based on the input observation; and
- generating the covariance estimate based on the modified-iterative value.

* * * * *